Oct. 29, 1929.  H. E. SMITH  1,733,830
FILM TAKE-UP DEVICE
Filed July 20, 1927   3 Sheets-Sheet 1

Inventor
Harry E. Smith
By
Attorney

Oct. 29, 1929.  H. E. SMITH  1,733,830
FILM TAKE-UP DEVICE
Filed July 20, 1927   3 Sheets-Sheet 2
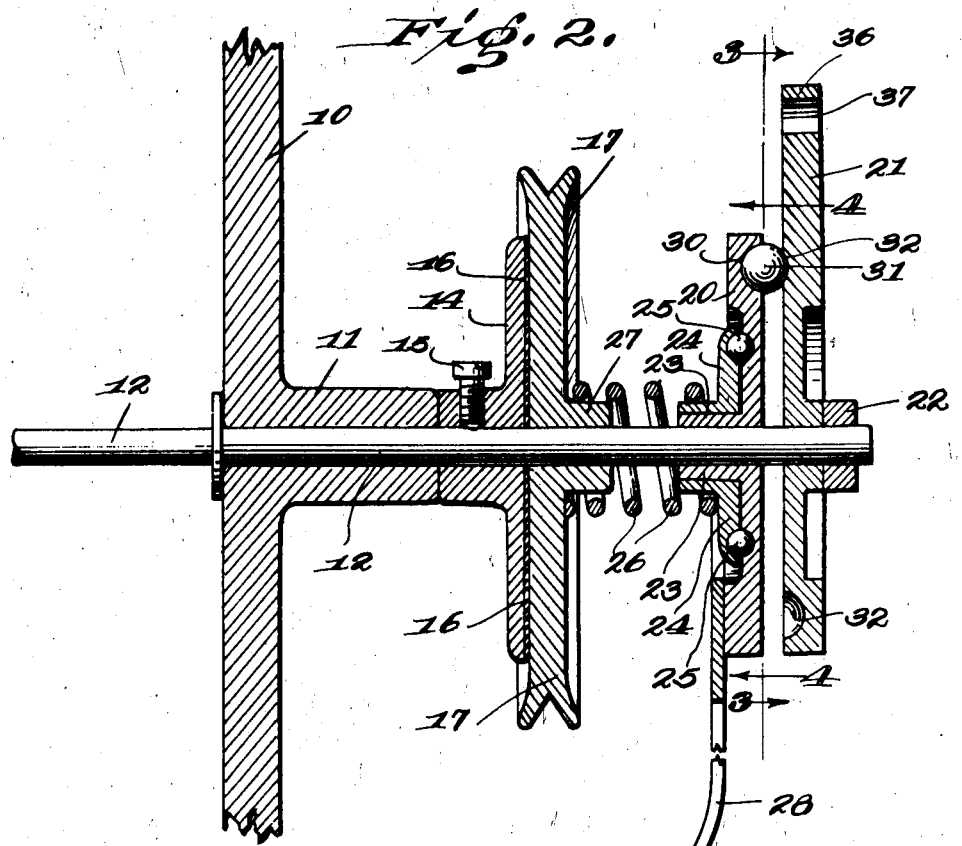
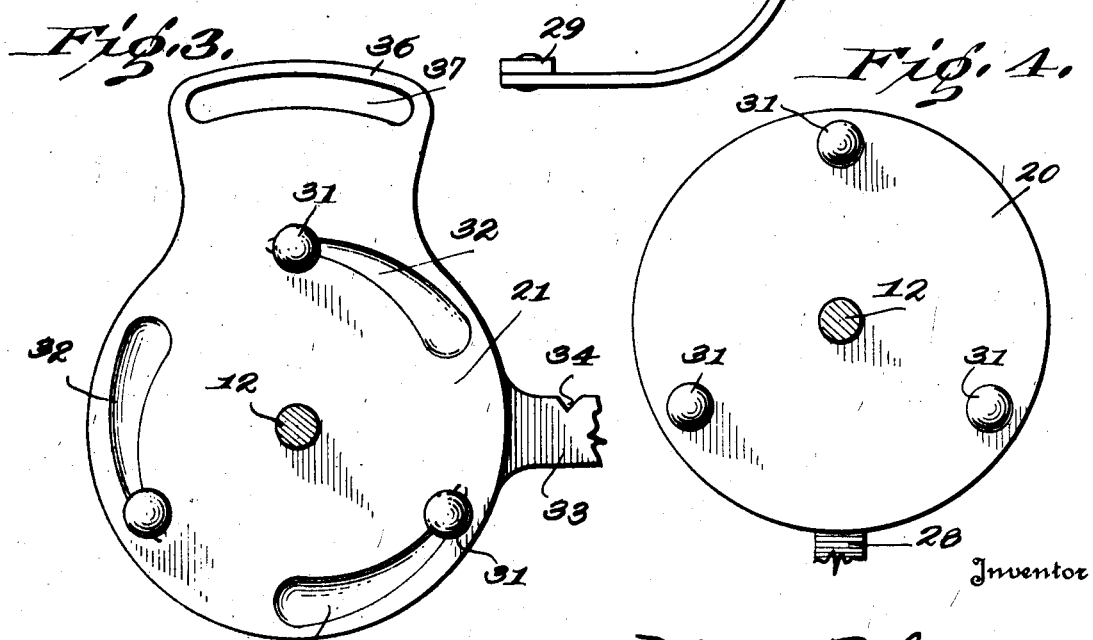
Inventor
Harry E Smith
By
Attorney Inventor Harry E. Smith By Attorney Patented Oct. 29, 1929

1,733,830

UNITED STATES PATENT OFFICE

HARRY E. SMITH, OF TOOELE, UTAH

FILM TAKE-UP DEVICE

Application filed July 20, 1927. Serial No. 207,173.

The present invention relates to automatic tension adjusters for the film take-up and feed reels in the lower and upper magazines of a motion picture projector, and aims to provide a novel and improved device of this character for obtaining an even tension on the film regardless of the amount of film on the take-up and feed reels.

Another object of the invention is to provide friction members in the drive connection to the take-up reel and in the rotatable mounting of the feed reel together with means for increasing and decreasing frictional engagement of said friction members according to the tension on the films, whereby to reduce the pull on the film by the take-up reel when the tension thereon is the greatest, which in most instances is when first winding the film on the take-up reel near the hub thereof, and for increasing the pull on the film by the take-up reel as the tension slackens, said tension adjuster for the feed reel being arranged for decreasing frictional engagement of the friction members as the tension of pull of film from the feed reel increases and for preventing spinning of the reel when the pull of film slackens.

A further object of the invention is the provision of yielding idlers over which the film to the take-up reel from the feed reel runs causing movement of said idlers as tension on the film is increased and decreased, said idlers being connected to slip clutch constructions in the driving connection to the take-up reel and mounting of the feed reel so as to increase and decrease frictional engagement of the clutch faces as tension on the film varies.

It is also an object of the invention to provide a device of the above indicated character, which is simple and substantial in construction, can be manufactured economically, and will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

Figure 1:
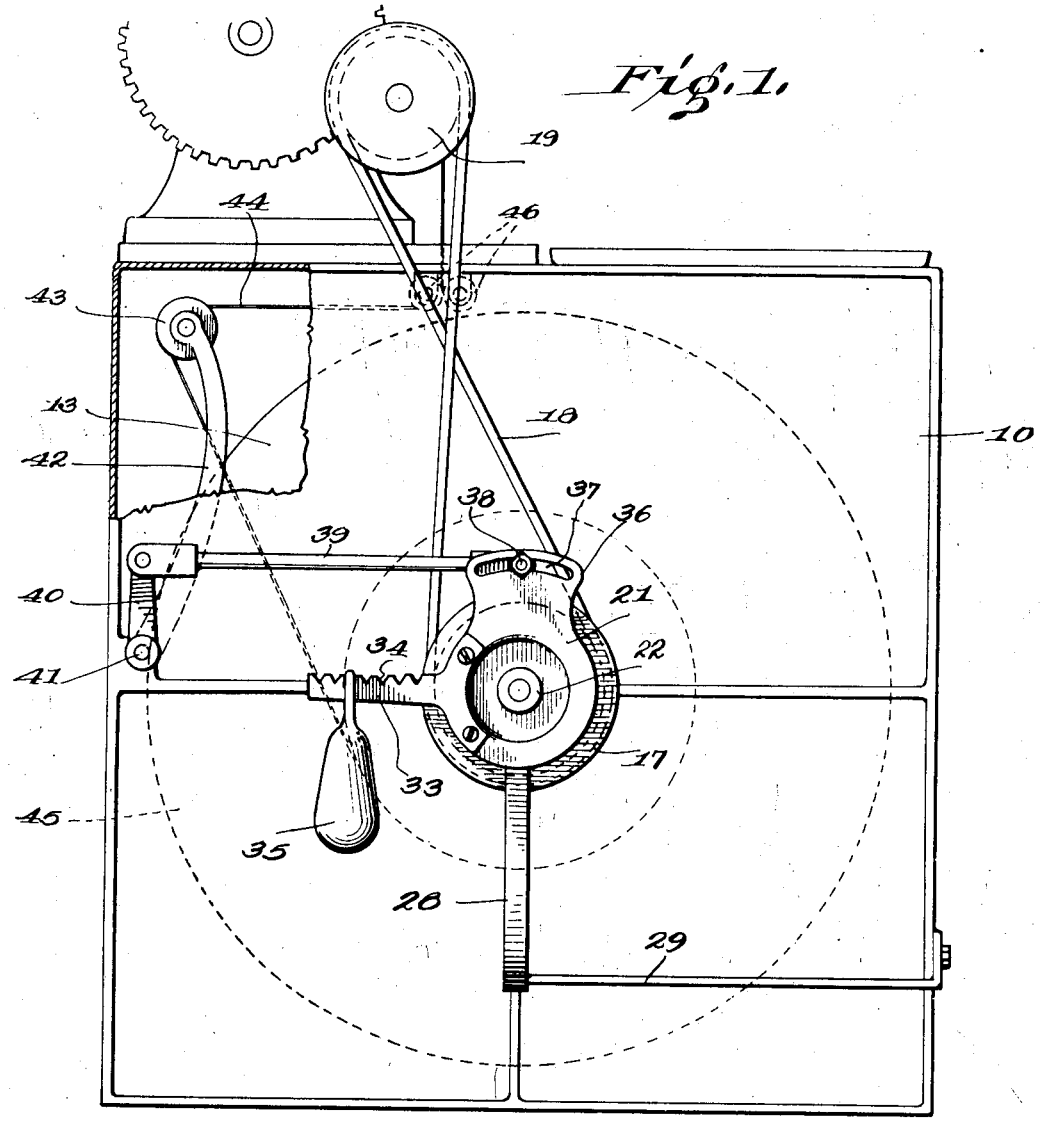

The invention is illustrated in the accompanying drawings, wherein:

Figure 1 is a rear elevation of the lower magazine of a motion picture projector showing my improved device applied thereto, said magazine having a portion thereof shown in section, Figure 2 is a fragmentary vertical section taken on line 2—2 of Figure 1, Figure 3 is a vertical section taken on line 3—3 of Figure 2, Figure 4 is a similar section taken on line 4—4 of Figure 2,

Figure 5:
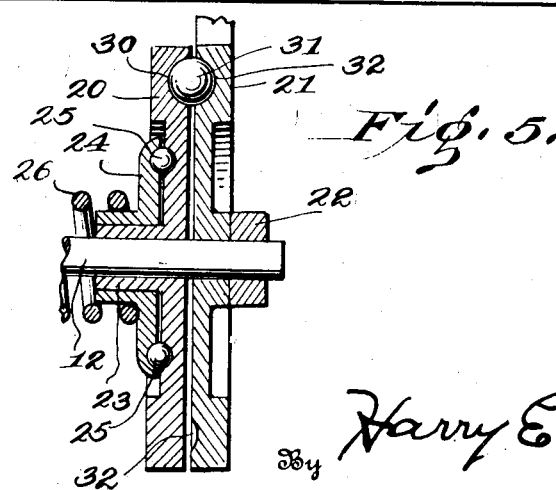
Figure 6:
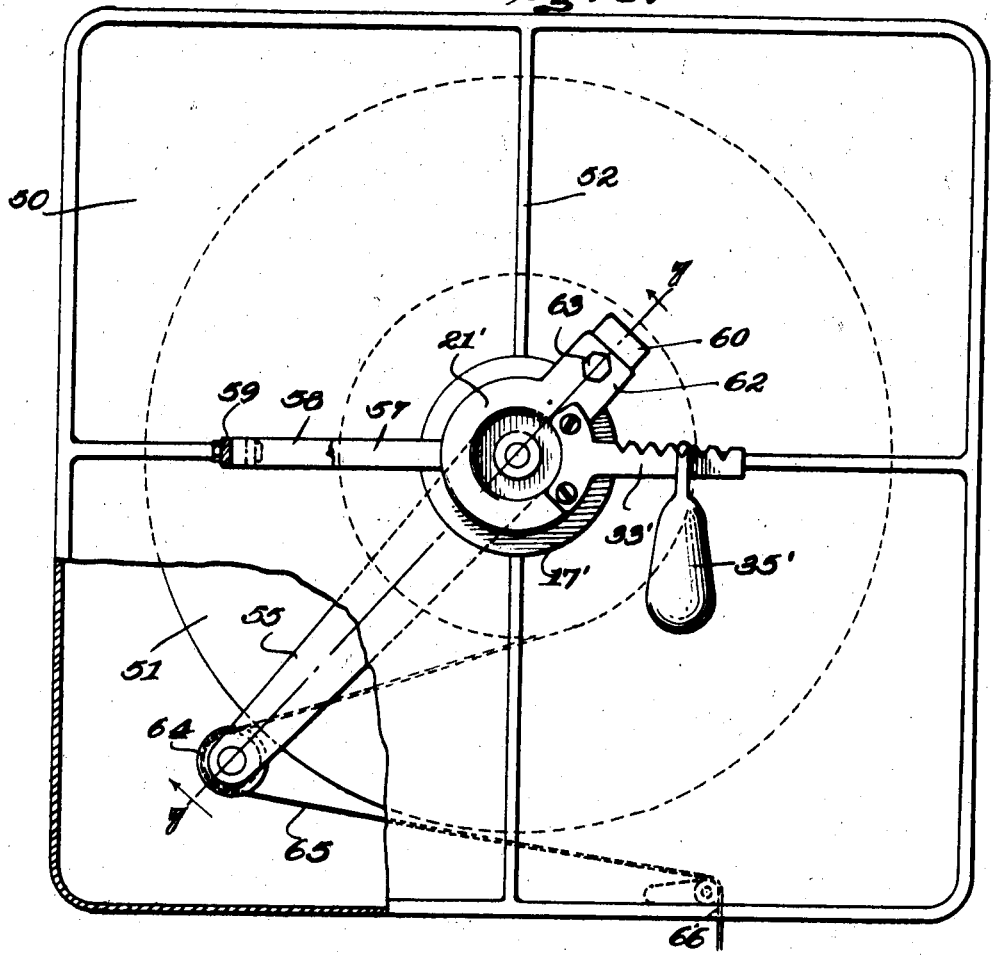
Figure 7:
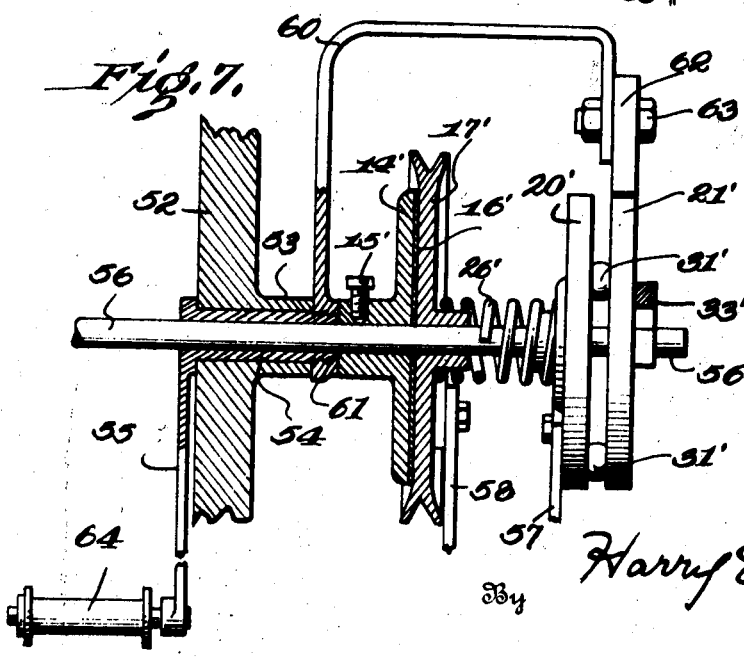

Figure 5 is a fragmentary section similar to a portion of Figure 2, showing certain parts in different positions, Figure 6 is a rear elevation of the upper magazine of a motion picture projector showing a modified form of tension adjuster on the feed reel, and Figure 7 is a fragmentary section and elevation taken on line 7—7 of Figure 6.

Referring to the drawings, the numeral 10 designates the lower magazine of a motion picture projector, having rotatably mounted in the bearing 11 at one side thereof a take-up spindle 12 adapted to support within the magazine a reel 13 and extending beyond the side of the magazine to provide for driving said spindle and reel. Mounted on the take-up spindle adjoining the bearing 11 is a friction disk 14, fixed to said spindle by means of a set screw 15, and having on the outer face thereof fiber or other suitable material 16 adapted to frictionally engage the contiguous face of a take-up pulley 17, said pulley being loose on the spindle and around which passes a belt 18 from a take-up drive pulley 19 so as to form a driving connection for the reel mounted within the magazine.

Loosely mounted upon the inner end of the take-up spindle 12 is a pair of companion plates 20 and 21 held against sliding movement off of the end of said spindle by means of a fixed collar 22. The inner plate 20 has a hub 23 projecting toward the pulley 17 and upon which is rotatably mounted a flanged collar 24 with anti-friction ball-bearings 25 between the flange and plate to permit turning movement of the same with relation to each other. Between the flanged collar 24 and pulley 17 is interposed a helical spring 26, one end of which fits over the collar against the flange thereof and the other end over a hub 27 at the inner side of the pulley. It can be seen that the coil spring will force the inner face of the pulley 17 into engagement with the friction disk 14 so as to form a driving connection for rotating the take-up spindle when the pulley is rotated and in order to prevent turning movement of the inner plate 20 when the pulley 17 is rotated a flexible bar 28 is secured to the inner face of said plate 20 and has its outer end attached to a bar 29 which in turn is secured to the magazine casing 10. The object of providing a flexible bar 28 will be set forth as the description proceeds.

The outer face of the plate 20 is provided with cup-shaped sockets 30 in which are seated metallic balls or spherical members 31, while the adjacent face of the plate 21 is provided with arcuate shaped grooves 32 inclined or tapered in depth and width and form opposite seats for said balls or spherical members. The tapered grooves 32 are disposed so that when the plate 21 is turned on the take-up spindle with relation to the companion plate 20, the latter will be forced away from said plate 21 due to the inclination or tapering of the grooves, thus increasing the tension on the spring 26 so as to increase friction on the engaging faces of the friction disk 14 and pulley 17. It is to be noted that all of the grooves are tapered or inclined in a direction so that when the plate 21 is turned partially in one direction the balls or spherical members 31 will be positioned in the large ends of the grooves, and when turned in the other direction they will be in the small ends of the grooves. In order to yieldably hold the plate 21 in a position with the balls or spherical members in the smaller or shallow ends of the grooves an arm 33 projects from one side thereof and is provided at its upper edge with a series of notches 34 for suspending from said arm an adjustable weight 35, whereby when the weight is adjusted outwardly on the arm more pressure will be applied for returning the plate 21 due to the fact that the leverage is increased, and that by moving the weight inwardly on the arm less pressure will be applied for returning said plate 21, as the leverage is decreased.

The plate 21 has an upper extension 36 provided with a slot 37 therein through which extends a bolt 38 for connecting one end of a connecting rod 39 thereto. The bolt 38 may be adjusted in the slot for a purpose which will be set forth as the description proceeds. The opposite end of the connecting rod 39 is connected to a lever 40 which is pivoted to the frame of the magazine 10, by means of a pivot pin 41, which extends into the magazine and has also secured thereto an arm 42, which extends upwardly in the magazine. On the free end of the arm 42 is rotatably mounted an idler pulley 43, over which the film 44 being wound upon the reel 13 is trained, said film on entering the magazine 10 passing between fire trap idlers 46. By referring to Figure 1 of the drawings, it can be seen that the film 44 normally tends to swing the arm 42 on its pivot due to tension of pulling strain on the film and that the weight 35 tends to hold the arm 42 in its normal position.

In operation, the pulley 17 is rotated by means of the belt 18 which causes the friction disk 14 attached to the take-up spindle to be rotated therewith, due to the fact that the coil spring 26 holds one face of the pulley in frictional engagement with said disk. From this it can be seen that by varying the tension of the spring 26, the pressure of the pulley against the friction disk may be varied to increase or decrease the frictional engagement of the pulley with the disk. When a film is first being wound upon the take-up reel mounted in the magazine on the spindle 12, the pull on the film is then the greater, consequently it is necessary to provide a certain slipping movement between the pulley and the disk. This is accomplished in the present instance by the fact that when a pull is exerted on the film the arm 42 carrying the idler 43 over which the film passes will be moved downwardly towards the hub of the reel thus moving the rod 39 endwise which will cause turning of the plate 21. Upon such turning movement of the plate 21, the balls or spherical members 31 will engage in the deep or largest portions of the tapered or inclined grooves 32 and allow the plate 20 to be moved towards the plate 21 which will decrease the tension of the spring 26 on the pulley, thus permitting a certain amount of slipping movement between the pulley and disk. As the film continues to be wound upon the reel the pull on the film lessens and the weight 35 will move the arm 42 and idler 43 back towards the normal position thereof. Upon this movement the plate 21 is moved so that the balls or spherical members 31 engage in the shallow or small portions of the tapered or inclined grooves 32, which will force the plate 20 away from the plate 21 to increase the tension of the coil spring 26 for eliminating slipping movement between the pulley and friction disk 14. From this it can be seen that the tensioning of the film is adjusted automatically.

The object of providing the flexible bar 28 is because it is necessary to hold the plate 20 against turning movement so that the same will be in proper position with relation to the plate 21 yet permit said plate 20 to be slid on the take-up spindle 12 for varying the tension of the spring 26. By providing the various notches in the arm 33, the weight 35 may be adjusted along the arm to permit swinging movement of the arm 42 by the film at the desired time. Thus, it can be seen that the device may be adjusted so that the frictional engagement between the pulley 17 and disk 14 may be varied at various tensions of the film, and that slot 37 in the extension 36 of the plate 21 will permit adjustment so as to cause the balls or spherical members 31 to engage in the proper portions of the grooves at the desired time.

Referring now to Figures 6 and 7 of the drawings, the numeral 50 designates the upper magazine within which is rotatably mounted the feed reel 51. The frame 52 of the magazine 50 has a bearing 53 thereon in which is journalled a sleeve 54 having an arm 55 within the magazine 50, and a detail description of which will be given as the description proceeds. In the sleeve 54 is rotatably mounted a spindle 56 on which the feed reel is mounted, said reel being attached to the spindle in the usual manner so as to cause turning movement of the spindle upon the rotating of the reel. The spindle 56 extends outwardly of the sleeve 54 and has attached thereto, by means of a set screw 15', a friction disk 14' having on one face thereof friction material 16'. Mounted free on the spindle 56 is a pulley 17' which is forced against the friction disk by means of a coil spring 26' interposed between said pulley and the inner disk 20' of a pair of disks 20' and 21, arranged upon the outer end of the spindle 56 for turning movement with relation to the spindle, and between these disks are ball or spherical members 31', seated in cup-shaped recesses and grooves in the plates in the same manner as that heretofore explained with reference to the plates 20 and 21. Attached to the outer disk 21' is an arm 33' carrying an adjustable weight 35', said arm and weight being similar to the arm and weight 33 and 35 previously described.

Attached to the disk 20' and to the pulley 17' respectively are flexible bars 57 and 58, the outer ends of which are attached to the frame of the magazine as indicated by the numeral 59. The purpose of the bars 57 and 58 is to prevent turning movement of the disk 20' and pulley 17', yet permit axial sliding movement thereof.

Threaded on the projecting end of the sleeve 54 and having a turning movement thereon is an inverted U-shaped member 60, the opposite side portion of which is attached to an extension 62 of the disk 21' by means of a bolt 63. The object of the inverted U-shaped member 60 is to cause turning movement of the disk 21' upon the spindle 56 when the arm 55 is turned on said spindle.

The arm 55 is positioned within the magazine 50 and at its free end carries an idler 64 over which the film 65 wound upon the reel 51 passes. The film 65 passes from the magazine 50 at the point designated by the numeral 66, and by referring to Figure 6 of the drawings the course the film travels when being unwound from the feed reel 51 can be traced.

In operation of this form of my invention as applied to the feed reel, the film 65 is unwound from the reel by a pull on the film caused by the feed sprocket of the motion picture projector. The film before passing from the magazine 50 travels in an indirect course around the idler 64 on the free end of the arm 55, and as the reel 51 is turned by the unwinding of the film it rotates the spindle 56. As the friction disk 14' is fixed to the spindle and the pulley 17' is prevented from turning by means of the flexible bar 58, the film must be pulled against the frictional engagement of these elements. When the tension on the film is increased, the arm 55 will be swung on the spindle 56 and thus raise the weight 55'. Upon swinging of the arm 55, the disk 21' will be turned on the spindle, which will permit the disk 20' to move towards the disk 21', due to the ball or spherical members 31' and the recesses and arcuate grooves in the disks 20' and 21' the operation being similar to that described in the other form of my invention, thus relieving tension on the spring 26' and decreasing the frictional engagement of the pulley 17' with the disk 14', which will permit easier slipping movement of the disk 14' with relation to the pulley 17'.

When first starting to unwind a film from the reel 51, the reel turns in a slow manner and due to the fact that a considerable amount of film is on the reel, a greater leverage for turning the reel 51 is had. Thus, it is necessary to have a greater frictional engagement between the disk 14' and pulley 17' than when a small amount of film remains on the reel, as the reel will then be rotated at a much faster rate of speed and the leverage is decreased, which will necessitate less frictional engagement between the disk 14' and pulley 17' in order to provide an even tension at all times. Furthermore, when a considerable amount of film is on the reel and the same is turned, a certain amount of momentum is set up which must be overcome by greater frictional engagement between the disk 14' and pulley 17' in order to prevent slack in the film.

In the form of my invention as applied to the feed reel, it is to be noted that by pivoting the arm 55 on the spindle 56 my improved structure may be attached to round magazines now on the market and that the idler will be permitted to travel around the reel and at all times take up whatever slack should occur.

While I have shown one form of my invention on the upper magazine containing the feed reel and another form of my invention on the lower magazine containing the take-up reel, I wish it clearly understood that either form of the invention may be employed with respect to one or both magazines, the difference being that when my improved device is arranged on the lower magazine containing the take-up reel a driving connection is had on the pulley 17' in order to rotate the take-up reel, and that when the same is used in connection with the upper magazine having the feed reel therein it is necessary to hold the pulley 17' against turning movement, as when in this position the film is unwound from the reel by a pull from the feed sprocket which causes the turning movement of the reel and thus eliminates the necessity of a drive for such reel.

Having thus described my invention, what I claim as new is:

1. A film tension adjuster for controlling movement of reels of motion picture projectors comprising a spindle on which the reel is mounted, a friction clutch mounted on said spindle and comprising a pair of clutch members one of which is fixed to the spindle and the other movable thereon, a spring on the spindle pressing the movable clutch member in engagement with the fixed member, and an axially movable plate on the spindle for regulating the tension of the spring; together with a movable arm, an idler carried by said arm and engageable with the film, and means connecting the arm to the plate for moving the latter axially to vary frictional engagement of the clutch members according to the tension on the film.

2. A film tension adjuster for controlling movement of reels of a motion picture projector comprising a spindle on which the reel is mounted, a friction clutch mounted on said spindle and having one of its members fixed to the spindle and the other movable thereon, a spring on the spindle engaging the movable clutch member, and a plate having a slidable movement on the spindle against the spring to regulate the tension thereof; together with a pivoted arm carrying an idler with which the film engages, and means on the spindle responsive to the movement of the arm for imparting sliding movement to said tension adjusting plate.

3. A film tension adjuster for controlling movement of reels of a motion picture projector comprising a spindle on which the reel is mounted, a friction clutch mounted on the spindle and having one of its members fixed to the spindle and the other movable thereon, a spring on the spindle engaging the movable clutch member, a plate having a slidable movement on the spindle for regulating the tension of the spring, means for holding said plate against turnable movement, and an anti-friction device between the plate and spring; together with a pivoted arm carrying an idler with which the film engages, and means on the spindle responsive to the movement of the arm for imparting sliding movement to said tension adjusting plate.

4. A film tension adjuster for controlling movement of reels of a motion picture projector comprising a spindle on which the reel is mounted, a friction clutch mounted on the spindle and having one of its members fixed to the spindle and the other movable thereon, a spring on the spindle engaging the movable clutch member, a plate having a slidable movement on the spindle for regulating the tension of the spring, a companion plate rotatable on the spindle, and means responsive to the rotatable movement of the last mentioned plate for sliding the tension plate; together with an arm connected to the rotatable plate and carrying an idler with which the film engages to vary frictional engagement of the clutch members according to the tension on the film.

5. A film tension adjuster for controlling movement of reels of a motion picture projector comprising a spindle on which the reel is mounted, a friction clutch mounted on the spindle and having one of its members fixed to said spindle and the other movable thereon, a spring on the spindle engaging the movable clutch member, a plate having a sliding movement on the spindle for adjusting the tension of the spring, a companion plate rotatable on the spindle, means responsive to the rotatable movement of the last mentioned plate for sliding the tension plate, and adjustable means for exerting a yielding movement to the rotatable plate in one direction; together with an arm carrying an idler with which the film engages connected to said rotatable plate for moving it in the other direction under tension of the film.

6. A film tension adjuster for controlling movement of reels of a motion picture projector, comprising a clutch mounted on a spindle, a laterally sliding member associated with said clutch for adjusting the frictional engagement of the faces thereof according to the position of said slidable member, a turnable member, means positioned between said slidable member and turnable member for adjusting said slidable member axially according to the position of said turnable member, means engageable with the film and connected with the turnable member so as to move said turnable member according to the tension on the film, and a weighted member carried by said turnable member for yieldably holding the same in a position against tension of the film.

7. A film tension adjuster for controlling movement of reels of a motion picture projector, comprising a clutch mounted on a spindle, a sliding member associated with said clutch for adjusting the frictional engagement of the faces thereof according to the position of said slidable member, a turnable member, cooperating with the slidable member, means between said slidable member and turnable member for adjusting the slidable position of the slidable member according to the position of said turnable member, means including an idler engageable with the film and connected with the turnable member to move the same according to the tension on the film, and an adjustable means for yieldably holding said idler in position against tension of the film.

8. A film tension adjuster for controlling movement of reels of motion picture projectors, comprising a spindle on which the reel is mounted, a slip clutch arranged upon said spindle, a pair of plates mounted on the spindle, one of said plates being mounted for slidable movement and the other of said plates for turning movement, a coil spring arranged between said clutch and said slidably mounted plate, one of said plates having sockets arranged therein and the other of said plates having inclined tapered grooves therein, spherical members positioned in said sockets and engageable in said inclined grooves so as to cause slidable movement of the slidable plate upon turning movement of the turnable plate for varying the tension on the coil spring and frictional engagement of the clutch faces, a pivoted arm, an idler carried by said pivoted arm and engageable with the film, and means connecting the arm with the turnable plate so as to cause turning movement of said turnable plate upon swinging movement of the arm.

9. A film tension adjuster for controlling movement of reels of motion picture projectors, comprising a spindle upon which a reel is attached, a slip clutch carried by said spindle, a spring for moving the faces of said clutch in engagement, means for varying the tension of said spring to permit the clutch to slip, a plate turnable upon said spindle, a pivoted arm connected to the plate, an idler carried by the free end of said arm and engageable with a film, said idler being arranged for movement at the periphery of the reel, and means operated by the plate to adjust the spring tensioning means.

10. A tension adjuster for the take-up reel of a motion picture projector comprising a take-up spindle, a clutch member carried by said spindle, a pulley rotatably mounted on said spindle and adapted to engage said clutch member at one side thereof, a coil spring for yieldably holding said pulley in engagement with said clutch member, a spring tension adjuster on the spindle for controlling the frictional engagement of said pulley with said clutch member, a rotatable plate having a pivoted arm connected thereto, an idler carried by said arm and engageable with the film leading to the take-up reel, and means connected to the arm and to said spring tension adjuster for varying the tension of the spring according to the tension on the film.

11. A tension adjuster for the take-up reel of a motion picture projector comprising a take-up spindle upon which is mounted the take-up reel, a clutch member carried by said take-up spindle, a power driven pulley loosely mounted upon said take-up spindle and adapted to engage said clutch member at one side thereof, a coil spring for yieldably forcing said pulley in engagement with said clutch member so as to form a driving connection to the take-up spindle, a pair of plates mounted on the take-up spindle one of which is slidably mounted on said take-up spindle while the other is mounted for turning movement thereon, a coil spring interposed between the pulley and the slidably mounted plate, one of said plates having sockets arranged therein while the other has tapered arcuate grooves provided therein, spherical members positioned in said sockets and engageable in said tapered grooves to cause sliding movement of the slidable plate upon turning movement of the turnable plate for varying the frictional engagement between the pulley and the clutch member, a pivoted arm connected to the turnable plate, an idler carried by the pivoted arm and engageable with the film leading to the take-up reel to cause turning movement of the turnable plate on swinging movement of the arm.

HARRY E. SMITH.